United States Patent [19]

Horiguchi

[11] Patent Number: 5,093,799
[45] Date of Patent: Mar. 3, 1992

[54] PAINTING-OUT PATTERN REFERENCE SYSTEM

[75] Inventor: Ryuji Horiguchi, Tokyo, Japan

[73] Assignee: NEC Corporation, Tokyo, Japan

[21] Appl. No.: 394,105

[22] Filed: Aug. 14, 1989

[30] Foreign Application Priority Data

Aug. 12, 1988 [JP] Japan .............................. 63-201228

[51] Int. Cl.$^5$ .......................................... G06F 15/62
[52] U.S. Cl. ...................................... 395/166; 340/750
[58] Field of Search ............... 364/518, 521, 522; 340/747, 750, 734, 735; 382/46, 56

[56] References Cited

U.S. PATENT DOCUMENTS

| | | | |
|---|---|---|---|
| 4,486,745 | 12/1984 | Konno | 340/734 |
| 4,815,029 | 3/1989 | Barker et al. | 364/900 |
| 4,849,747 | 7/1989 | Ogawa et al. | 340/735 |
| 4,881,067 | 11/1989 | Watanabe et al. | 340/750 |

*Primary Examiner*—Gary V. Harkcom
*Assistant Examiner*—Phu K. Nguyen
*Attorney, Agent, or Firm*—Foley & Lardner

[57] ABSTRACT

A painting-out pattern reference system comprises a graphic data memory for storing drawn graphic data to be displayed on a display screen, in the form of a bit image, the graphic data memory having a horizontal size of $2^n \times m$ words (where "n" and "m" are natural numbers); a pattern data memory storing a unitary painting-out pattern in the dorm of a bit image for defining the unitary painting-out pattern, the pattern data memory having a horizontal size of $2^n$ words; a drawing address memory storing a memory address for performing a painting-out drawing, the drawing address memory supplying the stored memory address to the graphic data memory; a pattern address memory storing a pattern head memory address of any line in the pattern data memory; and a pattern data selector receiving least significant n bits of an address output of the drawing address memory and the pattern head memory address from the pattern address memory for generating an address to the pattern data memory so as to cause at least one word of pattern to be selected among $2^n$ words of pattern stored in the pattern data memory so that the selected one word of pattern is supplied to the graphic data memory.

4 Claims, 4 Drawing Sheets

FIGURE 5A

2 LOWER BITS OF ADDRESS OF
PATTERN DATA MEMORY

|       | 00    | 01    | 10    | 11    |
|-------|-------|-------|-------|-------|
| 00    | (0,0) | (0,1) | (0,2) | (0,3) |
| PAD → 01 | (1,0) | (1,1) | (1,2) | (1,3) |
| 10    | (2,0) | (2,1) | (2,2) | (2,3) |
| 11    | (3,0) | (3,1) | (3,2) | (3,3) |

↑
2 HIGHER BITS OF ADDRESS OF
PATTERN DATA MEMORY

FIGURE 5B

2 LOWER BITS OF ADDRESS OF
GRAPHIC DATA MEMORY

| 00 | 01 | 10 | 11 | 00 | 01 | 10 | 11 |
|----|----|----|----|----|----|----|----|
|    | A  |    |    |    |    |    |    |
|    | 1,1) | (1,2) | (1,3) | (1,0) | (1,1) | (1,2) |    |
|    | 2,1) | (2,2) | (2,3) | (2,0) | (2,1) | (2,2) |    |
|    | 3,1) | (3,2) | (3,3) | (3,0) | (3,1) | (3,2) |    |
|    | 0,1) | (0,2) | (0,3) | (0,0) | (0,1) | (0,2) |    |
|    | 1,1) | (1,2) | (1,3) | (1,0) | (1,1) | (1,2) |    |

PAINTING-OUT PATTERN REFERENCE SYSTEM

BACKGROUND OF THE INVENTION

1. Field of the Invention

The present invention relates to a painting-out system for graphic systems, and more specifically to a painting-out pattern reference system for painting an inside area surrounded by a contour of a graphic pattern stored in a memory to be indicated on a screen of a display, by repeating a pattern defined in another area.

2. Description of Related Art

Hitherto, the inside of a graphic pattern stored in a memory to be indicated on a screen of a display system has been painted out not only by a mono-color but also by using a pattern defined in another area. For the latter purpose, conventional systems have been such that a painting-out pattern is defined in a memory in the form of a pattern having a width of one word and a height of any length. Ordinarily, one word is composed of 8 bits, 16 bits, or 32 bits, so as to correspond to a bus structure being used in the hardware. In addition, the painting-out pattern is developed in the overall memory, as painting-out tiles being laid over an overall area defined in the memory by matching a boundary of words with each other. In the case of painting-out an inside of a given graphic pattern drawn in a memory, the painting-out pattern is drawn in only the inside of the graphic pattern.

For example, assuming a pattern as shown in FIG. 1A, this pattern is developed in a memory as an imaginary pattern shown in FIG. 1B. If an inside of a rectangle ABCD shown in FIG. 1C is painted out by the pattern shown in FIG. 1A, the pattern shown in FIG. 1A is drawn within only the inside of the rectangle ABCD.

Here, the imaginary pattern shown in FIG. 1B is not actually stored over the whole of the memory. When the painting-out processing shown in FIG. 1C is performed, the painting-out processing is realized by controlling an address referring to the pattern shown in FIG. 1A, as if the pattern shown in FIG. 1A is repeated to extend over the whole of the memory.

Now, considering the case of painting out the inside of the rectangle ABCD, the painting-out processing is executing for the rectangle ABCD from an uppermost side AD, line by line. When an uppermost line is painted, an address of the pattern shown in FIG. 1A corresponding to the uppermost line is previously calculated. For this calculation, various methods have been known. However, the most ordinary method has been to perform the calculation on the basis of a Y-coordinate of an apex A of the rectangle. For example, assuming that the Y-coordinate of the apex A of the rectangle is Ya, the address PAD of the pattern firstly referred to can be expressed as follows:

$$PAD = PTNP + \{PTNC - (YA \bmod PTNC)\}$$

where
PTNP is a starting address for defining the pattern;
PTNC is the number of the patterns defined in the vertical direction; and
"mod" indicates a reminder when Ya is divided by PTNC; and
therefore, (Ya mod PTNC) indicates the number of words from PAD to the lowermost line of the pattern and will be called "PC" hereinafter.

For the purpose of out the uppermost line of the rectangle ABCD, the pattern of the address PAD is read out and repeated to paint out the uppermost line. When the painting-out processing is moved to a next line just below the uppermost line, a following calculation is performed for a reference address PAD of the pattern:

$$PAD = PAD + 1$$

The painting-out processing is performed by reading a pattern on the address thus obtained. At this time, however, the following calculation is simultaneously performed:

$$PC = PC - 1$$

As a result, if PC becomes negative, the following processing is performed:

$$PAD = PTNP$$

$$PC = PTNC$$

Thereafter, the pattern at the address PAD is read out and the painting-out processing is performed. Thus, continuity of the pattern in a vertical direction is ensured. Accordingly, if the above mentioned processing is downwardly repeated line by line, the inside of the rectangle ABCD is painted out with the pattern shown in FIG. 1A.

As seen from the above, the conventional system has been such that it is allowed to define only the width or horizontal length of the pattern. Therefore, when the painting-out processing is performed in a horizontal direction, it is sufficient if the same pattern is repeatedly used without the necessity of controlling the reference address of the pattern. In other words, it is sufficient if the reference address is controlled only when the vertical painting-out processing is performed.

However, a high degree of display has been recently desired, and in this case, the one word width of the painting-out unitary pattern is no longer sufficient. In addition, the resolution of the display has been increased, and therefore, the width of one word has already become of very minute size on the display screen. Accordingly, in order to comply with various painting-out patterns, it has become necessary to define a wider pattern.

As one means for extending or spreading the width of the pattern, it is considered to elongate the bit length of one word. However, this method requires modification of hardware including expansion of the bus width, and therefore, an increased amount of hardware is needed. In addition, in order to realize variable bit length of word, a very complicated hardware becomes necessary.

As another means for extending or spreading the width of the pattern, it is considered to define a painting-out unitary over a few words and to control the repetition of the unitary pattern when the painting-out processing is executed. In this method, however, in order to freely define the width of the unitary pattern, pattern reference address control is required not only in the vertical direction but also in a horizontal direction. For simultaneously realizing this pattern referring address controls in both the directions, very complicated software is required.

In addition, for this control, not only a comparison processing for the uppermost limit and the lowermost limit but also a comparison processing the rightmost limit and the leftmost limit is required. In the conventional system which does not require the control of the repetition of the unitary pattern in the horizontal direction, it is sufficient if the comparison in the vertical direction is performed very time one line has been painted out. On the other hand, in order to control the repetition of the unitary pattern in the horizontal direction, the comparison processing must be performed each time one word in a horizontal direction is painted out. As a result, the processing speed decreases remarkably.

SUMMARY OF THE INVENTION

Accordingly, it is an object of the present invention to provide a painting-out pattern system which overcomes the above mentioned defect of the conventional one.

Another object of the present invention is to provide a painting-out pattern reference system which can set the width of a unitary pattern with some extent of freedom with a simple control but without requiring modification of hardware such as extension of a base width.

The above and other objects of the present invention are achieved in accordance with the present invention by a painting-out pattern reference system comprising graphic data memory for storing a drawn graphic data to be displayed on a display screen, in the form of a bit image, the graphic data memory having a horizontal size of $2^n \times m$ words (where "n" and "m" are natural numbers); a pattern data memory storing a unitary painting-out pattern in the form of a bit image for defining the unitary painting-out pattern, the pattern data memory having a horizontal size of $2^n$ words; a drawing address memory storing a memory address for performing painting-out of a drawing, the drawing address memory supplying the stored memory address to the graphic data memory; a pattern address memory storing a pattern head memory address of any line in the pattern data memory; and a pattern data selector receiving least significant n bits of an address output of the drawing address memory and the pattern head memory address from the pattern address memory for generating an address to the pattern data memory so as to cause at least one word of a pattern to be selected among $2^n$ words of a pattern stored in the pattern data memory so that the selected one word of a pattern is supplied to the graphic data memory.

The above and other objects, features and advantages of the present invention will be apparent from the following description of preferred embodiments of the invention with reference to the accompanying drawings.

BRIEF DESCRIPTION OF THE DRAWINGS

FIGS. 5A and 5B illustrate the processing performed in the painting-out pattern reference system in accordance with the present invention.

DESCRIPTION OF THE PREFERRED EMBODIMENTS

Figure 1A:
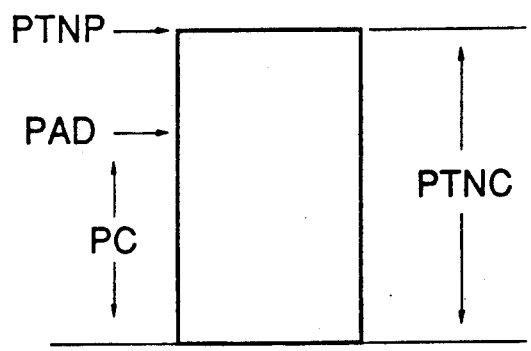
FIGS. 1A, 1B and 1C illustrate the principle of a conventional painting-out method.
Figure 1B:
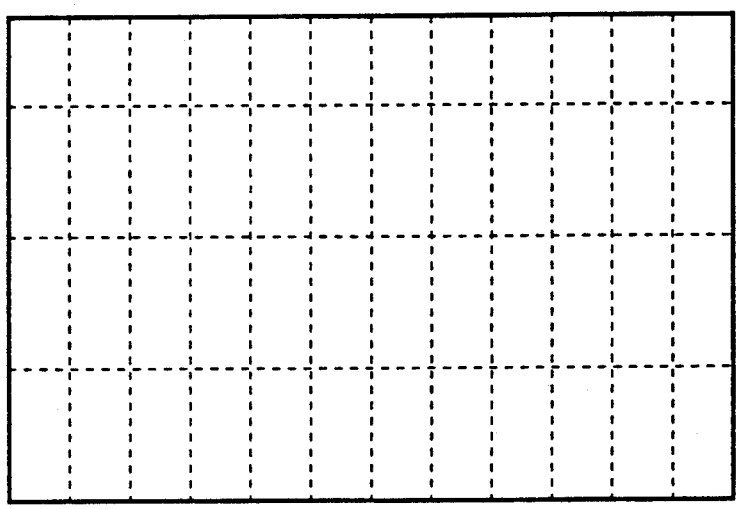
Figure 1C:
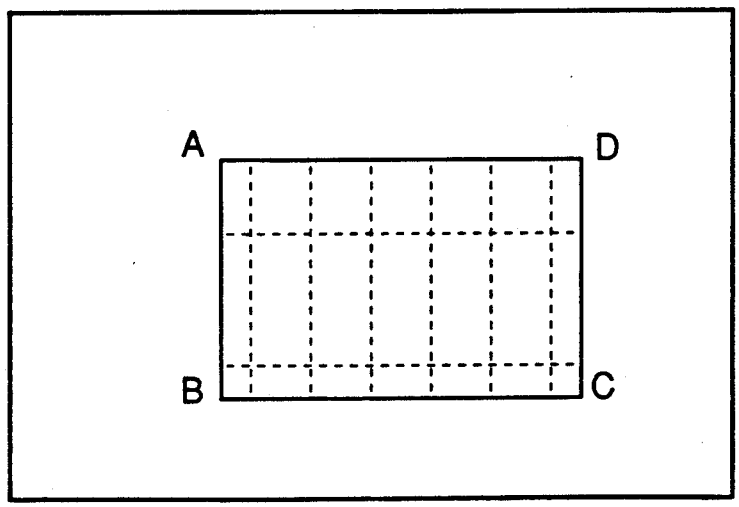
Figure 2:
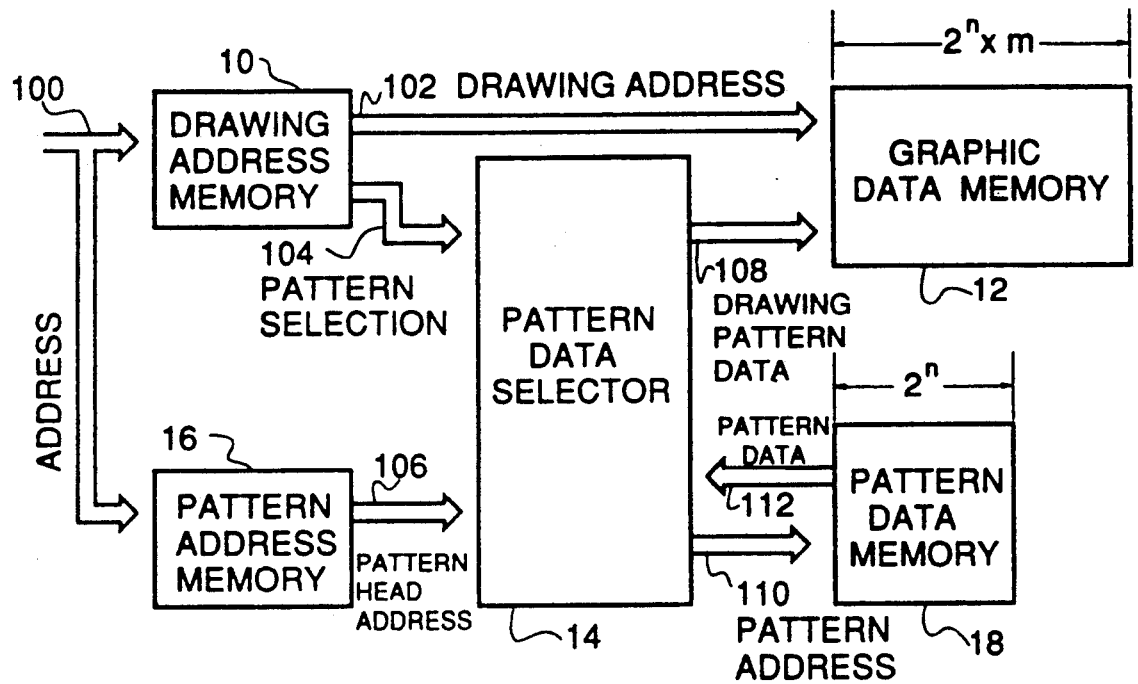
FIG. 2 is a block diagram of an embodiment of the painting-out pattern reference system in accordance with the present invention.

Referring to FIG. 2, there is shown a block diagram of an embodiment of the painting-out pattern reference system in accordance with the present invention. The system shown includes a drawing address memory 10 coupled to a bus 100 so as to receive an address signal. The drawing address memory 10 is coupled through a bus 102 to a graphic data memory 12 so as to supply a drawing address to the graphic data memory 12. In addition, the drawing address memory 10 is coupled through a bus 104 to a pattern data selector 14 to supply a pattern selection signal to the pattern data selector 14. The system shown also includes a pattern address memory 16 coupled to the bus 100 so as to receive the address signal. The pattern address memory 16 is also coupled through a bus 106 to the pattern data selector 14 to supply a pattern head signal to the pattern data selector 14. The pattern data selector 14 is coupled through a bus 108 to the graphic data memory 12 so as to supply drawing pattern data to the graphic data memory 12. In addition, the pattern data selector 14 is coupled through a bus 110 to a pattern data memory 18 so as to supply a pattern address signal to the pattern data memory 18, and also coupled through a bus 112 to the pattern data memory 18 so as to receive a pattern data signal from the pattern data memory 18.

The graphic data memory 12 is provided to store a graphic data to be displayed on the display screen, and has a memory size having a horizontal width (length of one line) of $2^n \times m$ words (where "n" and "m" are natural numbers). Accordingly, if the address of the memory is viewed from a column direction, the least significant n bits of each column are consistent with each other.

The pattern data memory 18 is provided to store unitary pattern data, and has a size having a horizontal width (length of one line) of $2^n$ words where "n" is equal to "n" defined in connection with the graphic data memory 12. Accordingly, the least significant n bits of a head address of each row are all zero.

The drawing address memory 10 stores a drawing address when painting-out of a drawing is actually performed for the graphic memory 12, and outputs the drawing address 102 to the graphic data memory 12. In addition, the drawing address memory 10 outputs least significant n bits of the drawing address as the pattern selection signal 104 to the pattern data selector 14.

The pattern address memory 16 stores a head address of a specific one line stored in the pattern data memory 18 referred to when the painting-out is performed for the graphic data memory 12 (namely one of the address having the least significant n bits as all zero, as mentioned above). The pattern address memory 16 outputs the stored address as the pattern head address 106 to the pattern data selector 14.

Figure 3:
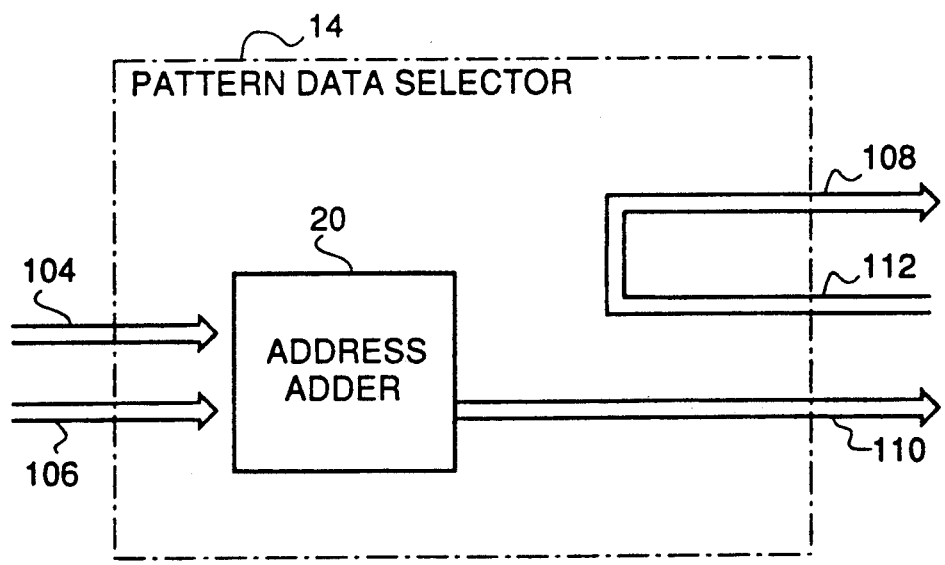
FIG. 3 is a block diagram of one example of the pattern data selector used in the system shown in FIG. 2.

Turning to FIG. 3, there is shown a block diagram of one example of the pattern data selector 14 used in the system shown in FIG. 2. The pattern data selector 14 shown includes an address adder 20 coupled to receive the pattern selection signal 104 from the drawing address memory 10 and the pattern head address signal 106 from the pattern address memory 16. The address adder 20 outputs the result of addition as the pattern address 110 to the pattern data memory 18. In addition, the bus 112 is directly coupled to the bus 108 so that the pattern data from the pattern data memory is outputted as the drawing pattern data to the graphic data memory 12.

FIGS. 5A and 5B illustrate a processing executed in the system shown. Specifically, FIG. 5A shows a pattern storing example in the pattern data memory 18, and FIG. 5B indicates the result of the painting-out processing performed within a rectangle on the graphic data memory 12.

Now, an operation of the first embodiment will be explained with reference to the drawings. Assume that, by referring to a unitary pattern defined to have a horizontal length (width) of "$2^2$" words and a vertical length (height) of "4" as shown in FIG. 5A, an inside of a rectangle drawn in the graphic data memory 12 as shown in FIG. 5B is painted out. For explanation, respective words of the unitary pattern are assigned the address numbers (0, 0), ..., and (3, 3) in the order of address.

Firstly, a drawing start address for the graphic data memory 12 is supplied through the address signal bus 100 to the drawing address memory 10, and an address PAD of a leftmost end of one line including the data where the reference to the pattern stored in the pattern data memory 18 is started, is set to the pattern address memory 16. This processing can be executed, similarly to the conventional method, on the basis of the Y-coordinate of the drawing starting point, and therefore, a detailed description thereof will be omitted.

For example, as shown in FIG. 5A, if PAD=$0100_B$ (the suffix "B" indicates an address of an binary notation hereinafter), and if a upper left apex A of the rectangle to be painted out stored in the graphic data memory 12 has a least significant 2 bits of "$01_B$", "$0100_B$" is first in set in the pattern address memory 16 and "$XXXX01_B$" is set in the graphic address memory 10 as the address of the apex A.

As a result, the least significant 2 bits "$01_B$" of the drawing address memory 10 are outputted as the pattern selection signal 104, so that the adder 20 of the pattern data selector 14 adds this data "$01_B$" and "$0100_B$" which is outputted as the pattern head address signal 106, and outputs "$0100_B$" as the pattern address signal 110.

As a result, the address "$0101_B$" is outputted to the pattern data memory 18, so that data at that address (the data of the number (1, 1)) is read out from the pattern data memory 18, and written in the address "$XXXX01_B$" of the graphic data memory 12.

Thereafter, if the painting-out processing is advanced rightward from the point A, a similar processing is repeated while incrementing the value of the drawing address memory 10 +1. Accordingly, only the least significant 2 bits of the pattern address are cyclicly changed in such a manner as "$01_B$", "$10_B$", "$11_B$", "$00_B$", "$01_B$", .... Therefore, the reference data changes in the order of (1, 2), (1, 3), (1, 0), (1, 1), (1, 2), (1, 3), .... In this processing, since the higher place of the address pattern will not change, the content of the pattern address memory 16 is never allowed to change until the precessing for one line has been completed.

After the precessing for one line has been completed, when the operation is moved to the processing for one next line, the content of the pattern address memory 16 is incremented by $+2^n$, so that the reference point of the pattern is shifted to the next line. At this time, similarly to the conventional method, it is discriminated whether or not the content of the pattern address memory 16 reaches the lower limit of the defined unitary pattern, and if it reaches the lower limit, the content of the pattern address memory is changed to the upper limit of the defined unitary pattern. Thus, repetition control of the unitary pattern in the vertical direction is achieved.

As seen from the above explanation, by giving some degree of limitation to the horizontal length (width) of each of the graphic data memory and the pattern data memory, an automatic pattern repetition control in the horizontal direction can realized by only using, as the painting-out pattern reference address, the address obtained by adding the least significant 2 bits for the graphic data memory 12 to the address for the pattern data memory 18.

Next, a second embodiment will be explained. This second embodiment has the same basic construction as that shown in FIG. 2, but uses the pattern data selector shown in FIG. 4.

The pattern data selector shown includes a pattern data buffer register 30, an address incrementer 32, a data selector 34, an address memory 36 and a buffer address memory 38, as shown.

Assuming that an address stored in the address memory 36 is PAD, the address incrementer 32 operates to increment the address stored in the address memory from PAD to (PAD+$2^n$−1). At the same time, the address incrementer 32 also operates to increment the content of the buffer address memory 38.

The address memory 36 is connected to the pattern address memory 16 so as to first store the address stored in the pattern address memory 16. However, the address memory 36 stores the address sequentially incremented by the address incrementer 32, and outputs the incremented address as the pattern address signal 110 to the pattern data memory 18.

The buffer address memory 38 is composed of a n-bit register and is initialized to zero. The content of the buffer address memory 38 is incremented from zero to ($2^n$−1) by the address incrementer 32. Since the address buffer memory 36 only has the capacity of n bits, when the content of the memory 38 exceeds ($2^n$−1), the content returns to zero, again. An output of the buffer address memory 38 is supplied to the pattern data selection signal 104.

The pattern data buffer register 30 is composed of $2^n$ registers so as to store $2^n$ items of pattern data outputted from the pattern data memory 18 to the pattern data bus 112. One register of the $2^n$ registers is selected by the data selector 34, so that the selected register is written with the pattern data when the pattern signal 112 is read out from the pattern data memory 18. On the other hand, when a drawing processing is performed for the graphic data memory 12, the content of the selected register is outputted as the drawing pattern data 108 to the graphic data memory 12.

The data selector 34 receives the pattern data selection signal 104 of n bits, and selectively activates one of 2n output lines connected to the $2^n$ registers of the pattern data buffer register 30, respectively, so that a corresponding one of the $2^n$ registers of the pattern data buffer register 30 is selected.

Figure 4:
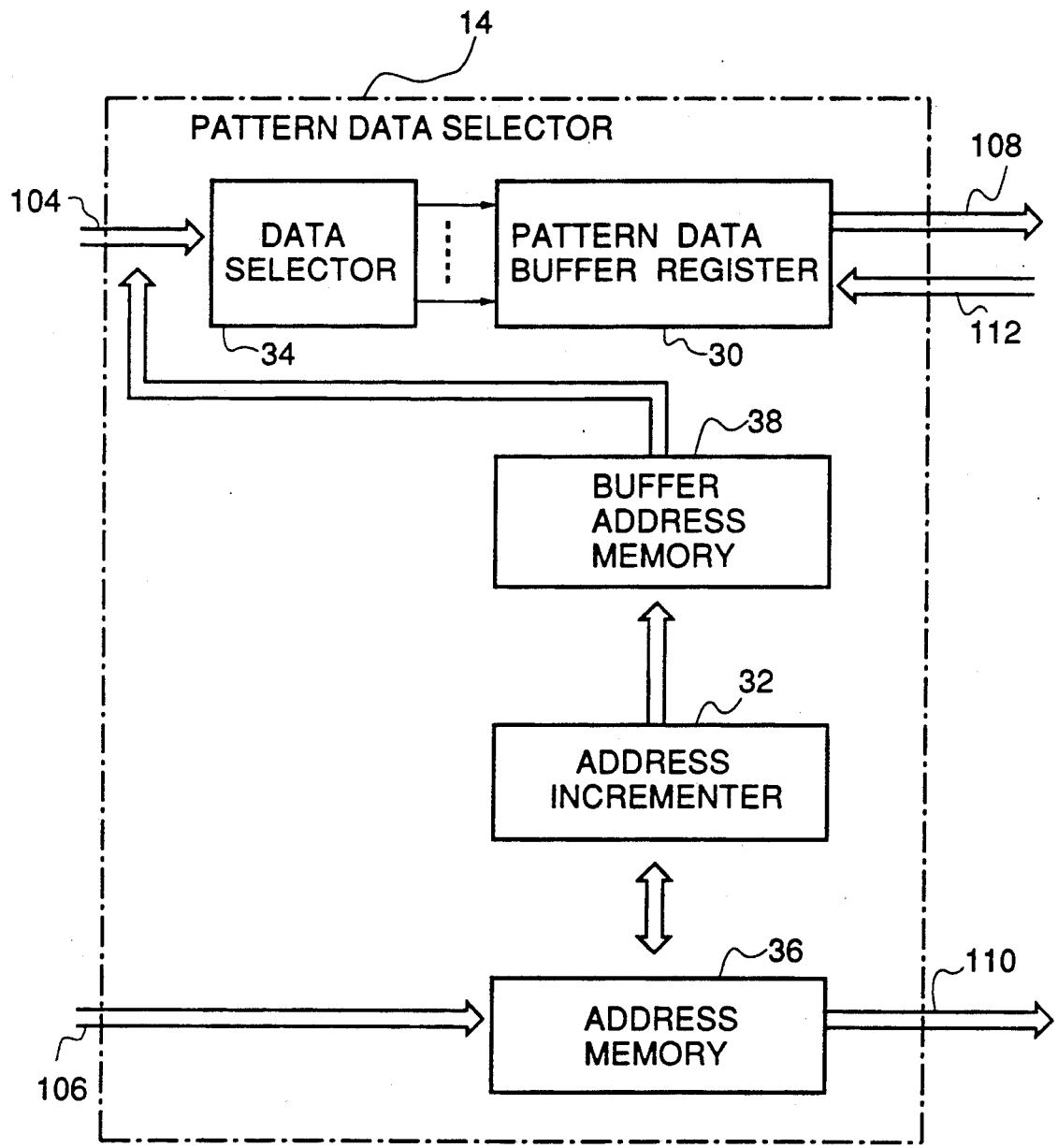
FIG. 4 is a block diagram of another example of the pattern data selector used in the system shown in FIG. 2.

Now, an operation of the second embodiment will be described with reference to FIGS. 2, 4 and 5.

First, similarly to the first embodiment, the drawing address and the reference address of the pattern are set to the drawing address memory 10 and the pattern address memory 16, respectively.

Thereafter, however, before the painting-out processing is performed for each line, the content of the address memory 36 is sequentially incremented one by one from PAD to (PAD+$2^n$−1), and the $2^n$ items of pattern data are sequentially read from the pattern data memory 18 to the pattern data buffer register 30. At this time, since the content of the buffer address memory 38 is incremented one by one from zero to ($2^n$−1), the $2^n$ items of pattern data sequentially read from the pattern data memory 18 are sequentially stored in the pattern data buffer register 30 in the read-out order. Namely, in the example shown in FIG. 5A, the four items of data (1, 0) to (1, 3) corresponding to one line designated by the address PAD is stored in the pattern data buffer register 30.

After the above mentioned pre-processing has been completed, the painting-out processing is started.

A basic operation of the painting-out processing in the second embodiment is similar to that of the first embodiment. Namely, while the content of the drawing address memory is incremented by +1, on time of pattern data is selected among the $2^n$ items of pattern data by using the least significant n bits of the drawing address. A main difference is that, in the second embodiment, the pattern data is not read out from the pattern data memory 18 each time the painting-out processing for one word is performed. Namely, as mentioned above, since the $2^n$ items of pattern data corresponding to one line are previously stored in the pattern data buffer register 30, one item of pattern data is selected from among the items of pattern data stored in the pattern data buffer register 30 in response to the pattern data selection signal 104, and the selected item of pattern data is outputted to the graphic data memory 12.

When the processing is moved to a next line, the content of the pattern address memory 16 is incremented by +$2^n$, similarly to the first embodiment, and then, the above mentioned processing is repeated. As a result, the second embodiment can perform the painting-out processing, similarly to the first embodiment.

In general, the painting-out drawing operation can be executed at a high speed if the number for accessing the graphic data memory 12 and the pattern data memory 18 is decreased to the possible. Ordinarily, the number of accesses to the graphic data memory 12 is determined by the size of an area for which the painting-out processing is performed, and therefore, consideration should be considered to reduce the number of the accesses to the pattern data memory 18.

In the first embodiment, the pattern must be read before the painting-out drawing operation for one word is performed. In the second embodiment, on the other hand, before the painting-out drawing operation for one line is performed, the pattern corresponding to one line is read, and the pattern is not read until the painting-out drawing operation for one line is completed. Therefore, in the case when the horizontal size (width) of the area to which the painting-out processing should be performed is large, the second embodiment can execute the painting-out processing at a speed higher than that of the first embodiment, since the second embodiment is smaller than the first embodiment in the number of the pattern readings.

As will be apparent from the above description, the painting-out pattern reference system in accordance with the present invention is characterized by limiting the horizontal size of a graphic data storing area to $2^n \times m$ words (where "n" and "m" are natural numbers) and also by limiting the horizontal size of a unitary pattern data storing area to $2^n$ words. With this feature, the painting-out pattern reference system in accordance with the present invention can set the width of a unitary pattern with some extent of freedom (by units of $2^n$ words) with a simple control but without requiring modification of hardware such as extension of a base width. Therefore, a high degree of drawing expression can be realized, and it is possible to paint out graphics on a high resolution display screen by various patterns.

The invention has thus been shown and described with reference to the specific embodiments. However, it should be noted that the present invention is in no way limited to the details of the illustrated structures but changes and modifications may be made within the scope of the appended claims.

I claim:

1. A painting-out pattern reference system comprising:
   a graphic data memory for storing drawn graphic data to be displayed on a display screen, in the form of a bit image, said graphic data memory having a horizontal size of $2^n \times m$ words (where "n" and "m" are natural numbers);
   a pattern data memory for storing a unitary painting-out pattern in the form of a bit image for defining said unitary painting-out pattern, said pattern data memory having a horizontal size of $2^n$ words;
   a drawing address memory for temporarily storing drawing start address of a predetermined region defined within said graphic data memory for performing a painting-out drawing, said drawing address memory supplying said stored drawing start address to said graphic data memory;
   a pattern address memory for storing a head address of a predetermined line in said pattern data memory; and
   a pattern data selector for receiving and combining least significant n bits of said drawing start address for said drawing address memory and said head address from said pattern address memory for generating an address which is supplied to said pattern data memory so as to cause at least one word of pattern to be selected as a selected one word of pattern from among $2^n$ words of pattern stored in said pattern data memory so that said selected one word of pattern is outputted from said pattern data memory and supply to said graphic data memory, so that said drawing start address is supplied to said graphic data memory as a data write address by incremented said drawing start address bit by bit, and said least significant n bits of said drawing start address and said head address are combined by said pattern data selector to form an address for said pattern data memory so that pattern data in said pattern data memory designated by a combined address is supplied to said drawing address memory as write data.

2. A painting-out pattern reference system claimed in claim 1 wherein said pattern data selector includes an adder having a first input for receiving least significant n bits of an address output of said drawing address memory, and a second input for receiving said head address from said pattern address memory, an output of said adder supplying a result of addition as said address which is supplied to said pattern data memory.

3. A painting-out pattern reference system claimed in claim 2 wherein said pattern data selector also includes a path for receiving said selected one word of pattern outputted from said pattern data memory and for supplying said selected one word of pattern to said graphic data memory without modification.

4. A painting-out pattern reference system claimed in claim 1 wherein said pattern data selector includes an address memory connected to receive an initial pattern head memory address from said pattern address memory and for incrementing said initial pattern head memory address so as to supply an incremented pattern memory address to said pattern data memory, a pattern data buffer register composed of $2^n$ registers connected to said pattern data memory so as to temporarily store pattern data corresponding to one line in such a manner that one word of pattern data is stored in one corresponding register, and a data selector operating to select said one register among $2^n$ registers of said pattern data buffer register so that said one word of pattern data temporarily stored in each register is sequentially read out to said graphic data memory.

* * * * *